US006172273B1

(12) United States Patent
Wu et al.

(10) Patent No.: US 6,172,273 B1
(45) Date of Patent: Jan. 9, 2001

(54) METHOD FOR CONVERTING HYDROCARBONS TO AROMATICS USING A HYBRID CATALYST SYSTEM

(75) Inventors: An-hsiang Wu, Bartlesville; Charles A. Drake, Nowata, both of OK (US)

(73) Assignee: Phillips Petroleum Company, Bartlesville, OK (US)

( * ) Notice: Under 35 U.S.C. 154(b), the term of this patent shall be extended for 0 days.

(21) Appl. No.: 09/511,468

(22) Filed: Feb. 23, 2000

Related U.S. Application Data

(62) Division of application No. 09/144,385, filed on Aug. 31, 1998, now Pat. No. 6,083,867.

(51) Int. Cl.[7] .......................... C07C 5/367; C07C 5/393; C07C 5/41; C10G 35/00; C10G 35/085

(52) U.S. Cl. ......................... 585/419; 585/407; 585/410; 585/411; 585/415; 585/416; 585/417; 585/418; 585/422; 208/115; 208/118; 208/199; 208/120.05; 208/120.35; 208/133; 208/134; 208/137; 208/138; 208/139; 208/141

(58) Field of Search .................................... 585/407, 410, 585/411, 415, 416, 417, 418, 419, 422; 208/115, 118, 119, 120.05, 120.35, 133, 134, 137, 138, 139, 141

(56) References Cited

U.S. PATENT DOCUMENTS

| | | | |
|---|---|---|---|
| 3,415,737 | 12/1968 | Kluksdahl | 208/139 |
| 3,511,888 | 5/1970 | Jenkins . | |
| 3,798,155 | 3/1974 | Wilhelm | 208/139 |
| 3,855,154 | 12/1974 | Mitchell, Jr. . | |
| 3,859,201 | 1/1975 | Wilhelm | 208/139 |
| 4,157,989 | 6/1979 | Antos | 252/441 |
| 4,165,276 | 8/1979 | Antos | 208/139 |
| 4,235,705 | 11/1980 | Antos | 208/139 |
| 4,298,504 | 11/1981 | Antos . | |
| 4,443,646 | 4/1984 | Jones et al. | 585/500 |
| 4,737,595 | 4/1988 | Jones et al. | 585/654 |

*Primary Examiner*—Elizabeth D. Wood
(74) *Attorney, Agent, or Firm*—Jeffrey R. Anderson

(57) ABSTRACT

A composition is prepared by a method which comprises mixing a first solid material comprising a platinum group metal, a rhenium component, a porous carrier material and, optionally, a halogen component and a second solid material comprising silica and bismuth. The thus-obtained composition is employed as a catalyst in the conversion of hydrocarbons to aromatics. In an alternate embodiment, hydrocarbons are converted to aromatics by sequentially contacting the hydrocarbons with the first solid material and then the second solid material.

35 Claims, No Drawings

METHOD FOR CONVERTING HYDROCARBONS TO AROMATICS USING A HYBRID CATALYST SYSTEM

This application is a division of application Ser. No. 09/144,385, filed Aug. 31, 1998, now U.S. Pat. No. 6,083,867.

The invention relates to catalyst systems useful in hydrocarbon upgrading processes and to methods for their production and use. In another aspect, this invention relates to processes for reforming saturated hydrocarbons employing the novel catalyst systems of this invention.

Catalysts for reforming saturated hydrocarbons are well known by those skilled in the art, and are described in the patent literature, e.g. in U.S. Pat. Nos. 4,298,504, 4,165,276, and 4,157,989. However, there are ever present incentives for the development of new, more effective and/or more practical catalyst systems and methods of preparing them.

SUMMARY OF THE INVENTION

It is an object of this invention to provide a novel hybrid catalyst system effective for at least partially reforming saturated hydrocarbons to aromatics.

It is another object of this invention to provide a method of preparing a novel hybrid catalyst system effective for at least partially reforming saturated hydrocarbons to aromatics.

It is a further object of this invention to employ this novel hybrid catalyst system as a catalyst in the at least partial reforming of saturated hydrocarbons.

It is still another object of the present invention to increase the efficiency of the conversion of saturated hydrocarbons to aromatics.

Yet another object of the present invention is to provide an improved reforming process of increased efficiency.

It is a further object of this invention to provide an improved method of preparing a catalyst system, effective for at least partially reforming saturated hydrocarbons to aromatics, which is economical and efficient.

It is a specific object of this invention to provide a novel hybrid catalyst system comprising a platinum group metal (including platinum, iridium, osmium, ruthenium, rhodium, palladium or mixtures of any two or more thereof), a rhenium component, optionally, a halogen component, a porous carrier material, bismuth and silica effective for at least partially reforming saturated hydrocarbons to aromatics.

According to a first embodiment of the present invention, a catalyst system which can be used for at least partially converting a hydrocarbon or a hydrocarbon mixture to an aromatic hydrocarbon is provided. The novel catalyst system comprises a first solid material comprising a platinum group metal, a rhenium component, optionally, a halogen component and a porous carrier material, and a second solid material comprising bismuth and silica.

According to a second embodiment of the present invention, a method which can be used for producing a catalyst system is provided. The method comprises the steps of:

incorporating a platinum group metal, rhenium and, optionally, a halogen component into a porous carrier material to form the first solid material;

incorporating bismuth into silica to form the second solid material; and blending the first and second solid materials to form the novel catalyst system.

According to a third embodiment of the present invention, a process is provided for the conversion of saturated hydrocarbons to aromatics by contacting under conversion conditions the saturated hydrocarbons with a novel catalyst system prepared by the method of the second embodiment.

According to a fourth embodiment of the present invention, a process is provided for the conversion of saturated hydrocarbons to aromatics by contacting under conversion conditions the saturated hydrocarbons with a first solid material comprising a platinum group metal, a rhenium component, optionally, a halogen component and a porous carrier material producing an intermediate stream, and contacting the intermediate stream with a second solid material comprising bismuth and silica.

According to a fifth embodiment of the present invention, a method is provided for preparing a catalyst system, effective for at least partially reforming saturated hydrocarbons, comprising placing a first solid material comprising a platinum group metal, a rhenium component, optionally, a halogen component and a porous carrier material into a contacting vessel directly above a second solid material comprising bismuth and silica.

Other objects and advantages will become apparent from the detailed description and the appended claims.

DETAILED DESCRIPTION OF THE INVENTION

According to the first embodiment of the present invention the catalyst system can comprise, consist essentially of, or consist of a first solid material comprising a platinum group metal, a rhenium component, a porous carrier material and, optionally, a halogen component and a second solid material comprising, or consisting of, or consisting essentially of, bismuth and silica. The term "metal" used herein also includes a compound of the metal.

Considering first the first solid material, it is preferred that the porous carrier material be a porous, adsorptive, high surface area support having a surface area of about 25 to about 500 $m^2/g$. Examples of suitable porous carrier materials include, but are not limited to, aluminas such as for example α-alumina and γ-alumina; silicas; alumina-silica; aluminum phosphate; aluminum chlorohydrate; clays such as kaolinite, halloysite, vermiculite, chlorite, attapulgite, smectite, montmorillonite, illite, saconite, sepiolite, palygorskite; activated carbon; coke; charcoal; crystalline zeolitic aluminosilicates (such as ZSM-5); and spinels such as $MgAl_2O_4$, $FeAl_2O_4$, $ZnAl_2O_4$ and $CaAl_2O_4$, and combinations of any two or more thereof. Because these porous carrier materials are well known to one skilled in the art, description of which is omitted herein. The presently preferred porous carrier material is alumina because it is readily available.

An essential ingredient of the first solid material is a platinum group metal. It is an essential feature that substantially all of this platinum group metal is uniformly distributed throughout the porous carrier material in the elemental metallic state prior to the incorporation of the rhenium. This platinum group metal may be present in the first solid material in any amount that is catalytically effective. Generally, the amount of platinum group metal present in the first solid material is in the range of from about 0.01 to about 2 weight %, preferably in the range of from about 0.05 to about 1 weight % based on the total weight of the first solid material, measured on an elemental platinum group metal basis. Particularly preferred mixtures of these platinum group metals for use in the first solid material are: (1) platinum and iridium and (2) platinum and rhodium.

Optionally, a halogen component may be incorporated into the platinum group metal-containing porous carrier material prior to incorporation of rhenium. This halogen may be fluorine, chlorine, iodine, bromine, or mixtures of any two or more thereof. It is customary in the art to refer to the halogen component as being combined with the porous carrier material, or with the platinum group metal in the form of the halide. This halogen component may be in the first solid material in any amount that is catalytically effective. Generally, the amount of halogen component present in the first solid material will be in the range upwardly to about 10 weight %, preferably from about 0.5 to about 5 weight %, and most preferably from 0.5 to 1.5 weight % based on the total weight of the first solid material, measured on an elemental halogen basis.

Another essential ingredient of the first solid material is a rhenium component. The rhenium component present in the first solid material is preferably a pyrolyzed rhenium carbonyl component. The pyrolyzed rhenium carbonyl component can be either the pure pyrolyzed rhenium carbonyl component itself or a substituted pyrolyzed rhenium carbonyl component such as a pyrolyzed rhenium carbonyl halide component including the chlorides, bromides, iodides and mixtures of any two or more thereof. This rhenium component may be present in the first solid material in any amount that is catalytically effective. The preferred amount of rhenium component present in the first solid material is in the range of from about 0.01 to about 5 weight %, most preferably from about 0.05 to about 1 weight % based on the total weight of the first solid material, measured on an elemental rhenium basis. Generally, the atomic ratio of the rhenium component to the platinum group metal is in the range of from about 0.1:1 to about 10:1, preferably from about 0.2:1 to about 5:1, and most preferably from 0.5:1 to 3:1.

Considering next the second solid material, any silica materials capable of supporting a catalytically effective amount of bismuth are suitable for use herein. Advantageously, the silica has a surface area in the range of from about 300 to about 750 $m^2$/gram. The preferred form of silica is colloidal silica.

An essential ingredient of the second solid material is bismuth. The bismuth may be present in the second solid material in any amount that is catalytically effective. Generally, the amount of bismuth present in the second solid material is in the range of from about 1 to about 99 weight %, preferably from about 10 to about 80 weight %, and most preferably from 20 to 60 weight % based on the total weight of the second solid material, measured on an elemental bismuth basis.

All weight percents of components of the catalyst system can be measured using X-ray fluorescence analysis, as described in "Spectrometry: Principles and Practices in X-Ray Spectrometric Analysis" by Eugene Burton, 2nd edition.

The first solid material can be prepared by combining a platinum group metal, a rhenium component, porous carrier material, and, optionally, a halogen component in amounts sufficient to provide the final first solid material having the weight percents disclosed above under any conditions sufficient to effect the production of the first solid material. The second solid material can be prepared by combining silica and bismuth in amounts sufficient to provide the final second solid material having the weight percents disclosed above under any conditions sufficient to effect the production of the second solid material. The catalyst system can then be prepared by combining the first solid material and the second solid material under any conditions sufficient to effect production of such a catalyst system.

According to the second embodiment of the present invention, the catalyst system can be prepared by the following method.

Considering first the preparation of the first solid material, the platinum group metal can be incorporated in the porous carrier material in any suitable manner known to result in a relatively uniform distribution of this component in the carrier material such as coprecipitation, cogelation, ion-exchange or impregnation. The preferred method of preparing the catalyst involves the utilization of a soluble, decomposable compound of platinum group metal to impregnate the carrier material in a relatively uniform manner. For example, this component can be added to the support by commingling the carrier material with an aqueous solution of chloroplatinic or chloroiridic or chloropalladic acid. Other water-soluble compounds or complexes of platinum group metals can be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetraaminepalladium (II) chloride, hexaaminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic, or chloropalladic acid or rhodium trichloride hydrate, is preferred since it facilitates the incorporation of both the platinum (group metal and at least a minor quantity of the preferred, and optional, halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum group metal.

It is especially preferred to incorporate the optional halogen component into the platinum group metal-containing porous carrier material prior to the reactions thereof with the rhenium carbonyl reagent. This halogen component can be either fluorine, chlorine, iodine, bromine, or mixtures of any two or more thereof. Of these, fluorine and, particularly, chlorine are preferred. The halogen can be added to the carrier material in any suitable manner, either during preparation of the support or before or after the addition of the platinum group metal. For example, the halogen can be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, can be combined with the carrier material during the impregnation of the latter with the platinum group metal; for example, through the utilization of a mixture of chloroplatinic acid and hydrogen chloride. In another situation, the alumina hydrosol, which is typically utilized to form a preferred alumina carrier material, can contain halogen and thus contribute at least a portion of the halogen component to the final composite.

After the platinum group metal is combined with the porous carrier material, the resulting platinum group metal-containing carrier material will generally be dried at a temperature in the range of from about 200° F. to about 600° F. for a period of typically from about 1 to about 24 hours or more and thereafter oxidized at a temperature in the range of from about 700° F. to about 1100° F. in an air or other oxygen atmosphere for a time period in the range of from about 0.5 to about 10 or more hours or for a time period sufficient to convert substantially all of the platinum group component to the corresponding platinum group oxide. When the preferred halogen component is utilized in the present composition, best results are generally obtained when the halogen content of the platinum group metal-containing carrier material is adjusted during this oxidation step by including a halogen or a halogen-containing compound in the air or other oxygen atmosphere utilized. The particularly preferred halogen is chlorine and it is highly recommended that the halogen compound utilized in this halogenation step be either hydrochloric acid or a hydrochloric acid-producing substance. In particular, when the halogen compound is HCl, it is preferred to use a molar ratio of $H_2O$ to HCl in the range of from about 5:1 to about 100:1 during at least a portion of the oxidation step which follows the platinum group metal impregnation in order to adjust the final chlorine content to a range upwardly to about 10 weight % based on the total weight of the first solid material, measured on an elemental chlorine basis. Preferably, the duration of this halogenation step is in the range of from about 1 to about 5 or more hours.

A critical feature involves subjecting the resulting oxidized, platinum group metal-containing, and optionally, halogen-treated, porous carrier material to a substantially water-free reduction step before the incorporation of the rhenium component by means of the rhenium carbonyl component. This reduction step is designed to reduce substantially all of the platinum group component to the elemental metallic state and to assure a relatively uniform and finely divided dispersion of this metallic component throughout the porous carrier material. Preferably a substantially pure and dry hydrogen stream ("dry" means that the hydrogen stream contains less than 20 vol. ppm. water and preferably less than 5 vol. ppm. water) is used as a reducing agent in this step. The reducing agent is contacted with the oxidized, platinum group metal-containing carrier material at conditions including a reduction temperature in the range of from about 450° F. to about 1200° F. for a time period in the range of from about 0.5 to about 10 or more hours selected to reduce substantially all of the platinum group metal component to the elemental metallic state. Once this condition of finely divided dispersed platinum group metal in the porous carrier material is achieved, it is important that environments and/or conditions that could disturb or change this condition be avoided; specifically, the freshly reduced carrier material containing the platinum group metal should be maintained under a blanket of inert gas to avoid any possibility of contamination of same either by water or by oxygen.

A second essential ingredient of the first solid material is a rhenium component which, in a presently preferred form, is characterized as a pyrolized rhenium carbonyl component in order to emphasize that the rhenium moiety of interest is the rhenium produced by decomposing a rhenium carbonyl component in the presence of a finely divided dispersion of a platinum group metal and in the absence of materials such as oxygen or water which could interfere with the basic desired interaction of the rhenium carbonyl component with the platinum group metal component as previously explained. In view of the fact that all of the rhenium contained in a rhenium carbonyl component is present in the elemental metallic state, an essential requirement is that the resulting reaction product of the rhenium carbonyl component or complex with the platinum group metal-containing, and optionally, halogen treated, porous carrier material is not subjected to conditions which could in any way interfere with the maintenance of the rhenium moiety in the elemental metallic state; consequently, avoidance of any conditions which would tend to cause the oxidation of any portion of the rhenium component or of the platinum group metal component is highly desired.

The rhenium carbonyl component can be reacted with the reduced platinum group metal-containing, and optionally, halogen-treated, porous carrier material in any suitable manner known to those skilled in the art which results in relatively good contact between the rhenium carbonyl component and the platinum group metal contained in the porous carrier material. One acceptable procedure for incorporating the rhenium carbonyl component into the composite involves sublimating the rhenium carbonyl component under conditions which enable it to pass into the vapor phase without being decomposed, and thereafter contacting the resulting rhenium carbonyl component sublimate with the platinum group metal-containing porous carrier material under conditions suitable for achieving intimate contact of the rhenium carbonyl component with the platinum group metal dispersed on the porous carrier material. Typically this procedure is performed under vacuum at a temperature in the range of from about 70° F. to about 250° F. for a period of time sufficient to react the desired amount of rhenium carbonyl component with the porous carrier material. In some cases an inert carrier gas such as nitrogen can be admixed with the rhenium carbonyl component sublimate in order to facilitate the intimate contacting of same with the platinum group metal-containing, and optionally, halogen-treated, porous carrier material. A particularly preferred way of accomplishing this rhenium carbonyl component reaction step is an impregnation procedure wherein the platinum group metal-containing, and optionally, halogen-treated, porous carrier material is impregnated with a suitable solution containing the desired quantity of the rhenium carbonyl component. For purposes of the present invention, organic solutions are preferred, although any suitable solution may be utilized as long as it does not interact with the rhenium carbonyl component and cause decomposition of same. Obviously the organic solution should be anhydrous in order to avoid detrimental interaction of water with the rhenium carbonyl component. Suitable solvents are any of the commonly available organic solvents such as one of the available ethers, alcohols, ketones, aldehydes, paraffins, naphthenes and aromatic hydrocarbons, for example, acetone, acetyl acetone, benzaldehyde, pentane, hexane, carbon tetrachloride, methyl isopropyl ketone, benzene, n-butylether, diethyl ether, ethylene glycol, methyl isobutyl ketone, disobutyl ketone and the like organic solvents. Best results are ordinarily obtained when the solvent is acetone; consequently, the preferred impregnation solution is rhenium carbonyl component dissolved in anhydrous acetone. After impregnation of the carrier material with the rhenium carbonyl component, it is important that the solvent be removed or evaporated from the catalyst prior to decomposition of the rhenium carbonyl component by means of the hereinafter described pyrolysis step. This solvent is removed by subjecting the rhenium carbonyl component-impregnated carrier material to a temperature in the range of from about 100° F. to about 250° F. in the presence of an inert gas or under a vacuum condition until substantially no further solvent is observed to come off the impregnated material. In the preferred case where acetone is used as the impregnation solvent, this drying of the rhenium carbonyl component-impregnated carrier material typically takes about one half hour at a temperature of about 225° F. under moderate vacuum conditions.

After the rhenium carbonyl component is incorporated into the platinum group metal-containing, and optionally, halogen-treated, porous carrier material, the resulting composite is subjected to pyrolysis conditions designed to decompose substantially all of the rhenium carbonyl component, without oxidizing either the platinum group or the decomposed rhenium carbonyl component. This step is preferably conducted in an atmosphere which is substantially inert to the rhenium carbonyl component such as in a nitrogen, hydrogen or noble gas (such as helium, neon, argon, krypton, Xenon and radon) containing atmosphere. Preferably this pyrolysis step takes place in the presence of a substantially pure and dry hydrogen stream. It is much preferred to conduct this step in the substantial absence of free oxygen and substances that could yield free oxygen under the conditions selected. Likewise it is clear that best results are obtained when this step is performed in the total absence of water and of hydrocarbons and other organic materials. Best results in pyrolyzing the rhenium carbonyl component are obtained using an anhydrous hydrogen stream at pyrolysis conditions including a temperature in the range of from about 300° F. to about 900° F., or more preferably in the range of from about 400° F. to about 750° F., for a time period in the range of from about 0.5 to about 5 or more hours or until no further evolution of carbon monoxide is noted. After the rhenium carbonyl component has been pyrolyzed, it is a much preferred practice to maintain the resulting first solid material in an inert environment (i.e. a nitrogen or the like inert gas blanket) until it is loaded into a reaction zone for use in the conversion of hydrocarbons.

Considering now the preparation of the second solid material, a silica, preferably colloidal silica, can be well mixed with a bismuth compound, preferably bismuth oxide in a liquid such as water, by any means known to one skilled in the art such as stirring, blending, or kneading. The resultant mixture can then be extruded into pellets or tablets followed by calcining under a condition known to those skilled in the art. Generally such a condition can include a temperature in the range of from about 250° C. to about 1000° C., preferably from about 350° C. to about 750° C., and most preferably from 450° C. to 650° C. and a pressure in the range of from about 0.5 to about 50 atmospheres (atm), preferably from about 0.5 to about 30 atm, and most preferably from 0.5 to 10 atm for a time period in the range of from about 1 to about 30 hours, preferably from about 2 to about 20 hours, and most preferably from 3 to 15 hours.

The catalyst system of the present invention can be produced by combining the first solid material and the second solid material by any means known to those skilled in the art such as stirring or blending, preferably in a dry, inert gas atmosphere. The weight ratio of the first solid material to the second solid material in the finished catalyst system is in the range of from about 1:40 to about 10:1, preferably from about 1:20 to about 4:1, and most preferably from 1:10 to 3:1.

Some examples of suitable compositions useful as the first solid material in the inventive catalyst system which are commercially available are set forth in Table I.

TABLE I

| Company | Code | Active Agents |
|---|---|---|
| UOP | R-50 ® catalytic reforming catalyst | Pt/Re |
| UOP | R-51 | Pt/Re |
| UOP | R-56 | Pt/Re |
| UOP | R-60 | Pt/Re |
| UOP | R-62 | Pt/Re |

According to the third embodiment of the present invention, a process useful for converting at least a portion of a hydrocarbon feedstock to an aromatic hydrocarbon comprises, consists essentially of, or consists of contacting the hydrocarbon feedstock, which can comprise paraffins, olefins, naphthenes, and aromatic compounds, with a catalyst system under conditions sufficient to effect the conversion of at least a portion of a hydrocarbon mixture to an aromatic hydrocarbon or to enhance the weight % of produced aromatic hydrocarbons. The catalyst system can be the same as that disclosed in the first embodiment of the invention and can be produced by the method of the second embodiment of the invention.

The term "hydrocarbon feedstock" is generally referred to, unless otherwise indicated, as one or more hydrocarbons having from about 2 carbon atoms to about 30 carbon atoms, preferably about 3 to about 20 carbon atoms, and most preferably 4 to 16 carbon atoms per molecule. Non-limiting examples of suitable hydrocarbon feedstocks include gasolines from catalytic oil cracking (e.g., FCC and hydrocracking) processes, pyrolysis gasolines from thermal hydrocarbon (e.g., ethane, propane, and naphtha) cracking processes, coker naphtha, light coker naphtha, straight run naphtha, light naphtha and the like. The preferred hydrocarbon feedstock is a naphtha or is derived from a naphtha which generally contains more paraffins than combined content of olefins and aromatic compounds (if present). The most preferred hydrocarbon feedstock comprises at least one paraffin containing from 6 to 7 carbon atoms per molecule.

The contacting of the hydrocarbon feedstock with the catalyst system can be carried out in any technically suitable manner, in a batch or semicontinuous or continuous process, under a condition effective to convert a hydrocarbon to a $C_6$ to $C_8$ aromatic hydrocarbon. Generally, the hydrocarbon feedstock is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization processes are generally well known to one skilled in the art, the description of such aromatization reactor and aromatization processes is omitted herein for the interest of brevity. Such aromatization reactors and aromatization processes are described in U.S. Pat. Nos. 5,013,423 and 4,935,566. The reaction conditions can include a weight hourly space velocity of the fluid stream in the range of from about 0.01 to about 1000, preferably about 0.25 to about 250, and most preferably 0.5 to 100 $hr.^{-1}$. Weight hourly space velocity is defined as the pounds/hour of feed to the reaction zone divided by the total pounds of catalyst contained within the reaction zone. Generally, the pressure can be in the range of from about 0 to about 1000 psig, preferably from about 0 to about 450 psig, and most preferably from 20 to 400 psig, and the temperature is generally in the range of from about 250°

C. to about 1000° C., preferably from about 350° C. to about 750° C., and most preferably from 450° C. to 650° C.

The process effluent generally contains a light gas fraction comprising hydrogen and methane; a $C_2$–$C_3$ fraction containing ethylene, propylene, ethane, and propane; an intermediate fraction including non-aromatic compounds with higher than 3 carbon atoms per molecule; and a BTX aromatic hydrocarbons fraction (benzene, toluene, ortho-xylene, meta-xylene and para-xylene). Generally, the effluent can be separated into these principal fractions by any known methods such as, for example, fractionation distillation. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any suitable method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to form para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature in the range of from about 400° C. to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

According to the fourth embodiment of the present invention, the process of contacting the hydrocarbon feedstock described above can be modified to include contacting the hydrocarbon feedstock with the first solid material described above under reaction conditions disclosed above to produce an intermediate stream. The intermediate stream can then be contacted with the second solid material described above under the reaction conditions as described above to produce a final product stream having product compositions as described in the third embodiment. Sequential contacting of the hydrocarbon feedstock with the first solid material and second solid material allows for increased control of the ratios of the first and second solid materials and flexibility of operation and maintenance of the two catalyst beds.

According to the fifth embodiment of the present invention, the catalyst system can be prepared by the following method.

The catalyst system can be prepared by placing the first solid material described above into a contacting vessel and placing the second solid material described above into the contacting vessel such that, in the operation of such catalyst system in the at least partial reforming of a hydrocarbon feedstock comprising saturated hydrocarbons, the hydrocarbon feedstock contacts the first solid material prior to contacting the second solid material.

Alternatively, the catalyst system can be prepared by placing the first solid material described above into a first contactor vessel and placing the second solid material described above into a second contactor vessel. The first contactor vessel is connected in fluid flow communication with the second contactor vessel in a manner such that in the operation of the catalyst system in the at least partial reforming of a hydrocarbon feedstock comprising saturated hydrocarbons the first solid material is contacted by the hydrocarbon feedstock first.

The following examples are provided to further illustrate this invention and are not to be considered as unduly limiting the scope of this invention.

EXAMPLE I

This example illustrates the preparation of catalysts which were subsequently tested as catalysts in the conversion of a hydrocarbon feedstock to aromatics (BTX).

Catalyst A

A 14.50 gram sample of a colloidal silica solution manufactured by DuPont under product designation Ludox® AS-40 was physically mixed with 4.20 grams of bismuth oxide ($Bi_2O_3$). The formed mixture was then extruded into 1/16" diameter pellets and dried at room temperature followed by calcining at a temperature of about 538° C. for 6 hours. The final product contained about 42 weight percent bismuth.

Catalyst B

A commercially available catalyst manufactured by UOP (UOP LLC, DesPlaines, Ill.) under product designation R-62 was obtained for use as catalyst B.

EXAMPLE II

This example illustrates the use of the catalysts described in Example I as catalysts in the conversion of a hydrocarbon feed mixture comprising light naphtha to aromatics (BTX).

In Run 1, a 3.38 g sample of catalyst A described in Example I was placed into a stainless steel tube reactor (length: about 18 inches; inner diameter: about 0.5 inch). Light Naphtha from a refinery was passed downwardly through the reactor at a flow rate of about 13.68 g/hour, at a temperature of about 527° C. and at a pressure of about 55 psig. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 7.07 hours on stream are summarized in Table II.

In Run 2, a 3.34 g sample of catalyst B described in Example I was placed into a stainless steel tube reactor (length: about 18 inches; inner diameter: about 0.5 inch). Light naphtha from a refinery was passed downwardly through the reactor at a flow rate of about 13.68 g/hour, at a temperature of about 478° C. and at a pressure of about 52 psig. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6.84 hours on stream are summarized in Table II.

In Run 3, a 3.55 g sample of catalyst B described in Example I was placed into a stainless steel tube reactor (length: about 18 inches; inner diameter: about 0.5 inch). Light naphtha from a refinery was passed downwardly through the reactor at a flow rate of about 13.68 g/hour, at a temperature of about 526° C. and at a pressure of about 56 psig. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 7.03 hours on stream are summarized in Table II.

In Run 4, a 2.97 g sample of catalyst A described in Example I was placed into a stainless steel tube reactor (length: about 18 inches; inner diameter: about 0.5 inch) and a 3.57 g sample of catalyst B was placed on top of catalyst A in the same stainless steel tube reactor. Light naphtha from a refinery was passed downwardly through the reactor at a flow rate of about 25.06 g/hour, at a temperature of about 525° C. and at a pressure of about 59 psig. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 7.25 hours on stream are summarized in Table II.

In Run 5, a 3.00 g sample of catalyst A was pre-mixed (physical mixing) with a 3.50 g sample of catalyst B. The mixture was placed into a stainless steel tube reactor (length: about 18 inches; inner diameter: about 0.5 inch). Light naphtha from a refinery was passed downwardly through the reactor at a flow rate of about 29.76 g/hour, at a temperature of about 525° C. and at a pressure of about 60 psig. The formed reaction product exited the reactor tube and was passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 7.00 hours on stream are summarized in Table II.

TABLE II

| Run | Catalyst | $\Sigma C_6$ Paraffin Conversion Weight % | BTX Yield Weight % |
|---|---|---|---|
| 1 | A at 527° C. (control) | 0 | 0 |
| 2 | B at 478° C. (control) | 2.91 | 2.71 |
| 3 | B at 526° C. (control) | 29.57 | 21.58 |
| 4 | A + B at 525° C. (invention) (Sequential) | 42.91 | 33.29 |
| 5 | A + B at 525° C. (invention) (Physically mixed) | 42.51 | 33.47 |

The test data presented in Table II show that the use of the inventive catalysts in Runs 4 and 5 result in considerably increased $C_6$ paraffin conversion and BTX yield than control catalysts A (Run 1) and B (Runs 2 and 3) used alone.

Control Run 1 demonstrated that catalyst A alone was ineffective in paraffin conversion and BTX yield.

Inventive Run 4 demonstrated 1375% and 45% increases in paraffin conversion over control Runs 2 and 3, respectively. Inventive Run 4 also demonstrated 1128% and 54% increases in BTX yield over control Runs 2 and 3, respectively.

Inventive Run 5 demonstrated 1361% and 44% increases in paraffin conversion over control Runs 2 and 3, respectively. Inventive Run 5 also demonstrated 1135% and 55% increases in BTX yield over control Runs 2 and 3, respectively.

Reasonable variations, modifications, and adaptations can be made within the scope of the disclosure and the appended claims without departing from the scope of this invention.

What is claimed is:

1. A process for converting at least a portion of a hydrocarbon feedstock comprising at least one saturated hydrocarbon having in the range of from 2 to 30 carbon atoms per molecule to at least one aromatic which comprises contacting said hydrocarbon feedstock at a temperature in the range of from about 400° C. to about 750° C. with a catalyst system comprising a first solid material comprising a platinum group metal, a rhenium component, and a porous carrier material; and a second solid material comprising bismuth and silica.

2. A process as recited in claim 1 wherein said hydrocarbon feedstock comprises at least one paraffin containing from 6 to 7 carbon atoms per molecule.

3. A process as recited in claim 1 wherein said platinum group metal is platinum.

4. A process as recited in claim 3 wherein said hydrocarbon feedstock comprises at least one paraffin containing from 6 to 7 carbon atoms per molecule.

5. A process as recited in claim 1 wherein said first solid material further comprises a halogen component.

6. A process as recited in claim 5 wherein said hydrocarbon feedstock comprises at least one paraffin containing from 6 to 7 carbon atoms per molecule.

7. A process as recited in claim 1 wherein said second solid material is prepared by a method comprising:

mixing a bismuth-containing compound with colloidal silica to form a bismuth-silica mixture; and heating said bismuth-silica mixture at a temperature in the range of from about 400° C. to about 750° C. for a time period sufficient to form said second solid material.

8. A process as recited in claim 7 wherein said hydrocarbon feedstock comprises at least one paraffin containing from 6 to 7 carbon atoms per molecule.

9. A process as recited in claim 7 wherein said bismuth-containing compound is bismuth oxide.

10. A process as recited in claim 9 wherein said hydrocarbon feedstock comprises at least one paraffin containing from 6 to 7 carbon atoms per molecule.

11. A process as recited in claim 1 wherein said second solid material contains about 1 to about 99 weight % bismuth based on the total weight of said second solid material.

12. A process as recited in claim 11 wherein said hydrocarbon feedstock comprises at least one paraffin containing from 6 to 7 carbon atoms per molecule.

13. A process as recited in claim 1 wherein the weight ratio of said first solid material to said second solid material in said catalyst system is in the range of from about 1:10 to about 10:1.

14. A process as recited in claim 13 wherein said hydrocarbon feedstock comprises at least one paraffin containing from 6 to 7 carbon atoms per molecule.

15. A process for converting at least a portion of a hydrocarbon feedstock comprising at least one saturated hydrocarbon having in the range of from 2 to 30 carbon atoms per molecule to at least one aromatic which comprises contacting said hydrocarbon feedstock at a temperature in a range of from about 400° C. to about 750° C. with a catalyst system prepared in accordance with a method comprising blending a first solid material comprising a platinum group metal, a rhenium component, and a porous carrier material; and a second solid material comprising bismuth and silica.

16. A process as recited in claim 15 wherein said hydrocarbon feedstock comprises at least one paraffin containing from 6 to 7 carbon atoms per molecule.

17. A process in accordance with claim 5 wherein said platinum group metal is platinum.

18. A process as recited in claim 17 wherein said hydrocarbon feedstock comprises at least one paraffin containing from 6 to 7 carbon atoms per molecule.

19. A process in accordance with claim 15 wherein said first solid material further comprises a halogen component.

20. A process as recited in claim 19 wherein said hydrocarbon feedstock comprises at least one paraffin containing from 6 to 7 carbon atoms per molecule.

21. A process in accordance with claim 15 wherein said second solid material is prepared by a method comprising:

mixing a bismuth-containing compound with colloidal silica to form a bismuth-silica mixture; and heating said bismuth-silica mixture at a temperature in the range of from about 400° C. to about 750° C. for a time period sufficient to form said second solid material.

22. A process as recited in claim 21 wherein said hydrocarbon feedstock comprises at least one paraffin containing from 6 to 7 carbon atoms per molecule.

23. A process in accordance with claim 21 wherein said bismuth-containing compound is bismuth oxide.

24. A process as recited in claim 23 wherein said hydrocarbon feedstock comprises at least one paraffin containing from 6 to 7 carbon atoms per molecule.

25. A process in accordance with claim 15 wherein said second solid material contains from about 1 to about 99 weight % bismuth based on the total weight of said second solid material.

26. A process as recited in claim 25 wherein said hydrocarbon feedstock comprises at least one paraffin containing from 6 to 7 carbon atoms per molecule.

27. A process in accordance with claim 15 wherein the weight ratio of said first solid material to said second solid material in said catalyst system is in the range of from about 1:10 to about 10:1.

28. A process as recited in claim 27 wherein said hydrocarbon feedstock comprises at least one paraffin containing from 6 to 7 carbon atoms per molecule.

29. A process for converting at least a portion of a hydrocarbon feedstock comprising at least one hydrocarbon having in the range of from 2 to 30 carbon atoms per molecule to at least one aromatic which comprises:

contacting said hydrocarbon feedstock at a temperature in the range of from about 400° C. to about 750° C. with a first solid material comprising a platinum group metal, a rhenium component, and a porous carrier material to produce an intermediate stream; and contacting said intermediate stream at a temperature in the range of from about 400° C. to about 750° C. with a second solid material comprising bismuth and silica.

30. A process as recited in claim 29 wherein said first solid material further comprises a halogen component.

31. A process as recited in claim 29 wherein said platinum group metal is platinum.

32. A process as recited in claim 29 wherein said second solid material is prepared by a method comprising:

mixing a bismuth-containing compound with colloidal silica to form a bismuth-silica mixture; and heating said bismuth-silica mixture at a temperature in the range of from about 400° C. to about 750° C. for a time period sufficient to form said second solid material.

33. A process as recited in claim 32 wherein said bismuth-containing compound is bismuth oxide.

34. A process as recited in claim 29 wherein said second solid material contains from about 1 to about 99 weight % bismuth based on the total weight of said second solid material.

35. A process as recited in claim 29 wherein the weight ratio of said first solid material to said second solid material is in the range of from about 1:10 to about 10:1.

* * * * *